(12) United States Patent
Geller (10) Patent No.: US 9,539,998 B2
(45) Date of Patent: Jan. 10, 2017

(54) SYSTEM AND METHOD FOR IMPROVED CONTROL, RESPONSE AND ENERGY MANAGEMENT OF A VEHICLE

(71) Applicant: Toyota Motor Engineering & Manufacturing North America, Inc., Erlanger, KY (US)

(72) Inventor: Benjamin M. Geller, Hermosa Beach, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/682,000

(22) Filed: Apr. 8, 2015

(65) Prior Publication Data

US 2016/0297416 A1  Oct. 13, 2016

(51) Int. Cl.
| | | |
|---|---|---|
| *B60W 20/10* | (2016.01) | |
| *B60W 10/26* | (2006.01) | |
| *B60W 10/10* | (2012.01) | |
| *B60W 10/08* | (2006.01) | |
| *B60W 10/06* | (2006.01) | |
| *B60W 20/50* | (2016.01) | |
| *B60W 10/28* | (2006.01) | |
| *B60W 20/00* | (2016.01) | |

(52) U.S. Cl.
CPC ............ *B60W 20/10* (2013.01); *B60W 10/06* (2013.01); *B60W 10/08* (2013.01); *B60W 10/10* (2013.01); *B60W 10/26* (2013.01); *B60W 10/28* (2013.01); *B60W 20/50* (2013.01); *B60W 2540/10* (2013.01); *B60W 2540/12* (2013.01); *B60W 2540/18* (2013.01); *B60W 2710/0677* (2013.01); *B60W 2710/086* (2013.01); *B60W 2710/10* (2013.01); *B60W 2710/242* (2013.01); *B60W 2710/28* (2013.01); *Y10S 903/93* (2013.01)

(58) Field of Classification Search
USPC .......................................................... 701/22
See application file for complete search history.

(56) References Cited

U.S. PATENT DOCUMENTS

| | | | |
|---|---|---|---|
| 4,725,969 | A | 2/1988 | Onogi et al. |
| 4,828,066 | A | 5/1989 | Hayashi |
| 5,460,061 | A | 10/1995 | Redding et al. |
| 6,945,905 | B2 | 9/2005 | Tamai et al. |
| 7,004,141 | B2 | 2/2006 | Matthews et al. |

(Continued)

*Primary Examiner* — Anne M Antonucci
(74) *Attorney, Agent, or Firm* — Snell & Wilmer LLP (57) ABSTRACT

A hybrid vehicle for providing improved control, response and energy management. The vehicle including a first sensor configured to determine base data corresponding to an estimated age of the vehicle, a second sensor configured to determine feedback data corresponding to a response to a driver request for acceleration, braking or steering and a third sensor configured to determine variable data corresponding to a drag, a current environment or a weight of the vehicle. The vehicle including an electronic control unit configured to calculate an estimate of a present condition of the vehicle based on the base data, the feedback data and the variable data, adjust an energy management control data based on the estimate of the present condition of the vehicle and control at least one of a battery, a transmission, a motor or a fuel converter of the vehicle based on the energy management control data.

19 Claims, 4 Drawing Sheets

(56) References Cited

U.S. PATENT DOCUMENTS

| | | |
|---|---|---|
| 7,041,031 B2 | 5/2006 | Wheeler et al. |
| 7,795,839 B2 | 9/2010 | Bloomfield |
| 8,046,131 B2 | 10/2011 | Tanaka et al. |
| 8,602,142 B2 | 12/2013 | Books et al. |
| 8,670,913 B2 | 3/2014 | Sakaguchi et al. |
| 8,678,978 B2 | 3/2014 | Kim et al. |
| 2003/0184152 A1 | 10/2003 | Cikanek et al. |
| 2012/0078481 A1 | 3/2012 | Aldrich, III et al. |
| 2014/0012450 A1 | 1/2014 | Laing |
| 2014/0228168 A1 | 8/2014 | Kaufman et al. |
| 2015/0239365 A1* | 8/2015 | Hyde ................. B60L 11/1861 701/2 |

* cited by examiner

| SOURCE 405 | READING 410 | DATA 415 | VALUE 420 | COMPOSITE VALUE 425 | WEIGHTING 430 | PRESENT CONDITION 435 | ENERGY MANAGEMENT CONTROL DATA 440 |
|---|---|---|---|---|---|---|---|
| TIMER | 1,000 HOURS | BASE | 85 | 86.5 | 1.0 | 84.33 | 7030 |
| ODOMETER | 35,000 MILES | BASE | 88 | | | | |
| COUNTER | — | BASE | — | | | | |
| ACCELERATOR PEDAL | GOOD RESPONSE | FEEDBACK | 82 | 80 | 0.5 | | |
| BREAKING SYSTEM | FAIR RESPONSE | FEEDBACK | 78 | | | | |
| STEERING SYSTEM | — | FEEDBACK | — | | | | |
| DRAG SENSOR | — | VARIABLE | — | N/A | 1.0 | | |
| ENVIRONMENT SENSOR | — | VARIABLE | — | | | | |
| WEIGHT SENSOR | — | VARIABLE | — | | | | |
| PASSENGER SENSOR | 4 | VARIABLE | 30 | | | | |

FIG. 4

SYSTEM AND METHOD FOR IMPROVED CONTROL, RESPONSE AND ENERGY MANAGEMENT OF A VEHICLE

BACKGROUND

1. Field

The present invention relates to a system and method for improved control, response and energy management of a vehicle.

2. Description of the Related Art

A vehicle's performance and fuel economy generally decrease as the vehicle ages. Also, a vehicle's performance generally decreases the more weight the vehicle is carrying in terms of passengers and luggage. For example, when a vehicle has many passengers or is carrying a full load of luggage or other items, the vehicle tends to have decreased performance (e.g., responds sluggishly to accelerator inputs) and fuel economy. On the other hand, vehicles that are brand new or are carrying very little to no load (e.g., passengers or luggage) generally provide better performance and fuel economy than similar vehicles that are older and/or are carrying heavy loads.

To increase a vehicle's performance, many vehicle manufacturers have incorporated sport modes and/or paddle shifters into their vehicles to enhance performance by allowing drivers to change gears at relatively certain times. In addition, many vehicle manufacturers have utilized a different drive force map for each different operating mode (e.g., economy mode, normal mode and sport mode) to enhance a vehicle's performance and/or fuel economy. A drive force map provides a predetermined relationship between a driver's accelerator pedal input and a desired power/torque output of the vehicle. The sport mode allows for more power/torque output per a specified driver acceleration pedal input while the economy mode allows for less power/torque output per a specified driver acceleration pedal input. These drive force maps, however, do not provide the driver with a consistent vehicle response because they do not take into account the vehicle's age and/or loading condition. In addition, these methods do not incorporate vehicle feedback to provide a consistent vehicle response.

Thus, there is a need for vehicles that provide a consistent vehicle response to the driver depending on vehicle age predictions, vehicle feedback and/or vehicle conditions and provide better dynamics and energy management.

SUMMARY

A vehicle (e.g., a hybrid vehicle) for providing improved control, response and energy management. The vehicle including a first sensor configured to determine base data corresponding to an estimated age of the vehicle, a second sensor configured to determine feedback data corresponding to the vehicle's responsiveness to acceleration, braking or steering or a response to a driver request for acceleration, braking or steering and a third sensor configured to determine variable data corresponding to a drag, a current environment or a weight of the vehicle. The vehicle including an electronic control unit configured to calculate an estimate of a present condition of the vehicle based on the base data, the feedback data and the variable data, adjust energy management control data based on the estimate of the present condition of the vehicle and control at least one of a battery, a transmission, a motor or a fuel converter of the vehicle based on the energy management control data.

A vehicle (e.g., a hybrid vehicle) for providing improved control, response and energy management. The vehicle includes a transmission, a battery for storing energy, a motor for receiving energy from the battery and for providing power to the transmission, a fuel converter for providing energy to the battery and for providing power to the transmission, and a first sensor configured to determine variable data corresponding to a drag, a current environment or a weight of the vehicle. The vehicle also includes an electronic control unit configured to calculate an estimate of a present condition of the vehicle based on the variable data, adjust energy management control data based on the estimate of the present condition of the vehicle and control at least one of the battery, the transmission, the motor or the fuel converter of the vehicle based on the energy management control data.

A method for providing improved control, response and energy management for a vehicle (e.g., a hybrid vehicle) having a battery, a transmission, a motor, a fuel converter and an electronic control unit. The method includes receiving, by the electronic control unit, base data corresponding to an age of the vehicle, receiving, by the electronic control unit, feedback data corresponding to a response to the vehicle's responsiveness to acceleration, braking or steering or a driver request for acceleration, braking or steering and receiving, by the electronic control unit, variable data corresponding to a drag, a current environment or a weight of the vehicle. The method also includes calculating, using the electronic control unit, an estimate of a present condition of the vehicle based on the base data, the feedback data and the variable data. The method also includes adjusting, using the electronic control unit, energy management control data based on the estimate of the present condition of the vehicle and controlling at least one of the battery, the transmission, the motor or the fuel converter based on the energy management control data.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The invention provides an adaptive or consistent vehicle response to the driver independent of the vehicle's condition or age. That is, the invention reduces or eliminates changes in vehicle feel and response in order to advantageously provide drivers with a consistent and desired vehicle feel and response as the vehicle's condition or age changes. Information from sensors, systems, etc. are transmitted to an electronic control unit (ECU) for improved vehicle feel and response, for example, improved energy management, traction control, vehicle stability, braking, acceleration, and fuel economy.

The systems, ECUs and methods described herein provide vehicles (e.g., conventional, hybrid or electric vehicles) with a consistent vehicle response for the driver by obtaining and analyzing data such as vehicle predictions (e.g., from time, miles, etc.), vehicle feedback (e.g., response not meeting response targets, etc.) and vehicle conditions (e.g., cargo, drag, passengers, weight, etc.) to provide better dynamics and energy management as the vehicle ages. The systems, ECUs and methods adjust the vehicle requested power output based on an estimated present condition of the vehicle (e.g., age, response, weight, etc.) such that a repeatable response is achieved. The systems, ECUs and methods provide several benefits and advantages such improved control, responsiveness and energy management throughout the vehicle's life with reduced degradation in performance and fuel efficiency when compared to similar vehicles without this technology.

The present invention advantageously allows the power and energy management of the vehicle to be adjusted based on various factors such as the age, environment, responsiveness, drag and weight of the vehicle. Also, the percentage use or time of use of the battery, the motor and the fuel converter (e.g., a fuel cell or an internal combustion engine) can be adjusted or limited based on the aging or wear of these components or parts. For example, if the battery and/or the motor are not responding very well, the ECU can request more power and use from the engine in order to maintain a consistent response for the driver and from the vehicle. The aging of components and parts provide reduced performance and therefore balancing the use of the various components and parts helps reduce the vehicle's aging process and ensure operating efficiency while maintaining or producing a consistent response for the driver and the vehicle. The ECU makes adjustments to the power and energy provided to the vehicle based on vehicle predictions, vehicle feedback and vehicle conditions. In some embodiments, the adjustments are to increase requests to certain components or parts based on the tendency of other components or parts to have reduced output over time due to their aging or wear.

An exemplary system for providing improved control, response and energy management includes a first sensor configured to determine base data corresponding to an estimated age of the hybrid vehicle, a second sensor configured to determine feedback data corresponding to a response to the hybrid vehicle's responsiveness to acceleration, braking or steering or a driver request for acceleration, braking or steering and a third sensor configured to determine variable data corresponding to a drag, a current environment or a weight of the hybrid vehicle. The exemplary system also includes an electronic control unit configured to calculate an estimate of a present condition of the hybrid vehicle based on the base data, the feedback data and the variable data, adjust energy management control data based on the estimate of the present condition of the hybrid vehicle and control at least one of a battery, a transmission, a motor or a fuel converter of the hybrid vehicle based on the energy management control data.

Figure 1:
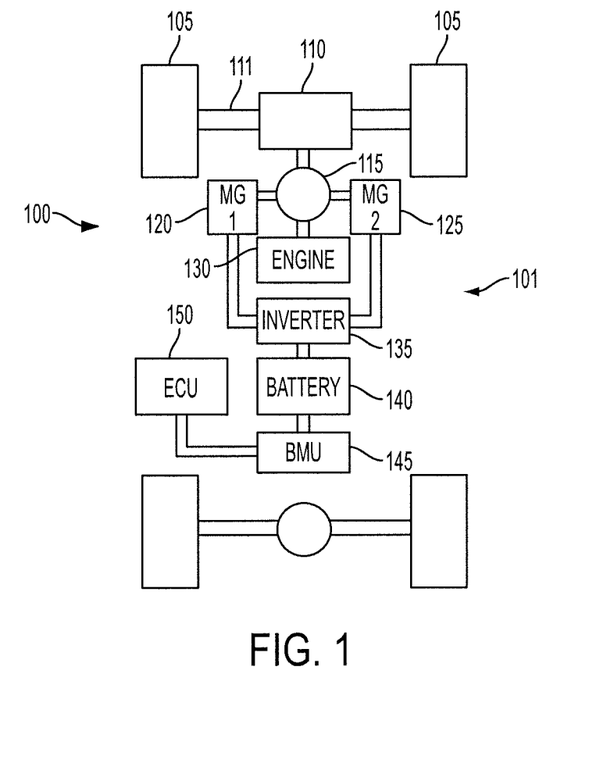
FIG. 1 illustrates a block diagram of a system for a hybrid vehicle according to an embodiment of the present invention.

FIG. 1 illustrates a block diagram of a system 101 for a hybrid vehicle 100 according to an embodiment of the present invention. The hybrid vehicle 100 can be a hybrid vehicle (HV), a plug-in hybrid vehicle (PHV), a fuel cell vehicle (FCV), a fuel cell electric vehicle (FCEV) and other similar vehicles. The hybrid vehicle 100 can also be configured as a non-hybrid, standard internal combustion engine vehicle.

The system 101 includes a transmission 110 (e.g., a continuously variable transmission (CVT)), a drive axle 111, a power splitting device 115, motor-generators (MG1 and MG2) 120 and 125, an internal combustion engine 130, an inverter 135 and a battery 140 (or batteries). The engine 130 and the motor-generators 120 and 125 are mechanically connected to the drive axle 111 via the transmission 110. In one embodiment, MG1 120 is used to recharge the battery 140 and supply electric power to directly drive MG2 125. A fuel cell can be used in place of the engine 130. The term "engine" will be used in this disclosure but one skilled in the art will know how to utilize a fuel cell in place of the engine 130. In addition, the term "fuel converter" will be used to refer to a device that receives fuel and converts the fuel into energy or power. Examples of a fuel converter include, but are not limited to, an internal combustion engine and a fuel cell.

By regulating the amount of electric power generated, MG1 120 can control the transmission 110. MG2 125 can be used to drive the wheels 105. In one embodiment, the motor-generators 120 and 125 can be replaced with an electric motor. The motor generators 120 and 125 (or an electric motor) and the engine 130 can be used individually or simultaneously to drive the wheels 105 of the hybrid vehicle 100. The electric motor can supplement the engine 130 and/or serve as a generator to recharge the battery 140 while the hybrid vehicle 100 is operating. The power splitting device 115 is used to switch operations from the engine 130 to the motor-generators 120 and 125 and vice versa. The inverter 135 is used to convert AC and DC current between MG1 120, MG2 125 and the battery 140.

Figure 2:
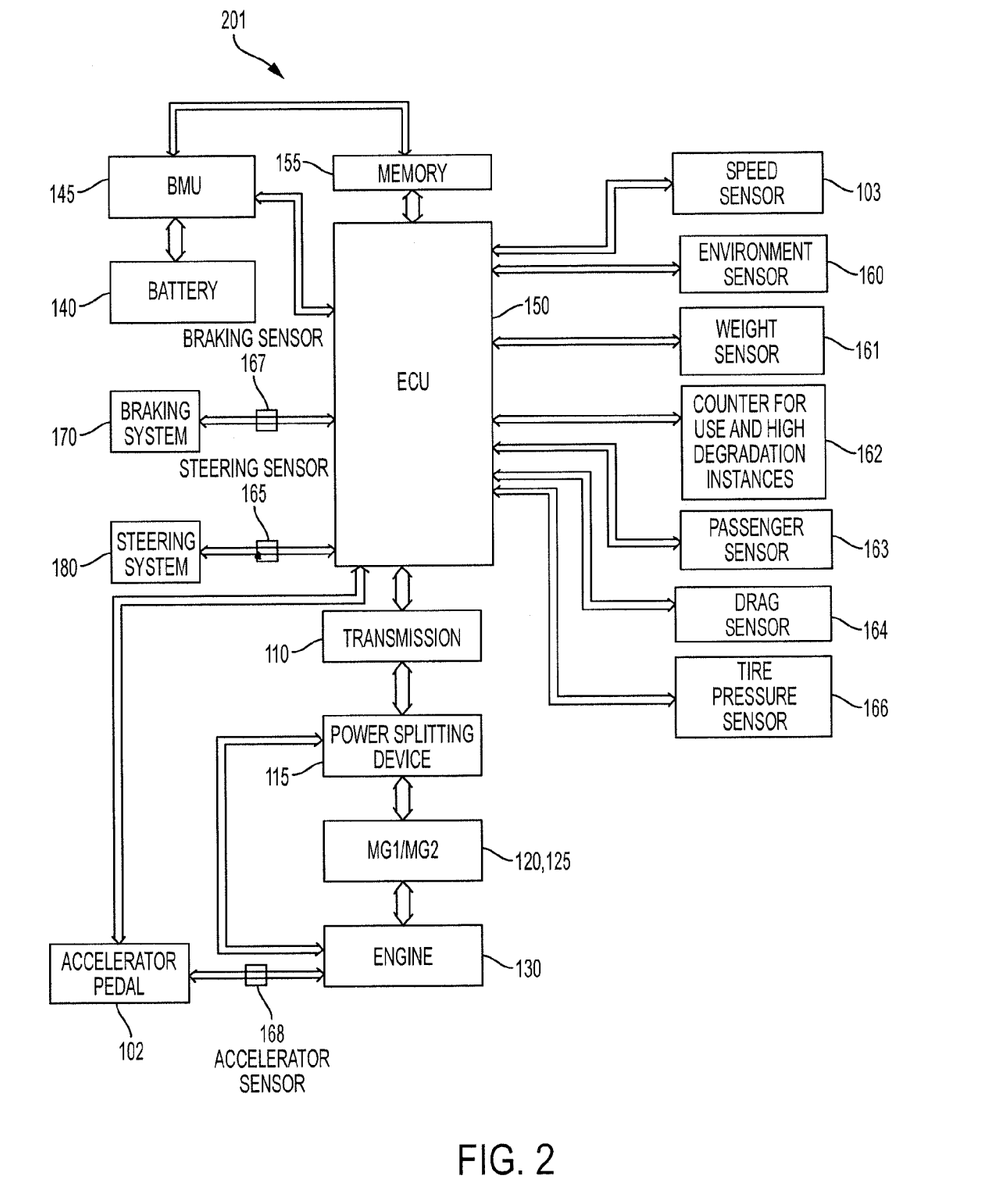
FIG. 2 illustrates a block diagram of a system for a hybrid vehicle according to an embodiment of the present invention.

FIG. 2 illustrates a block diagram of a system 201 for a hybrid vehicle 100 according to an embodiment of the present invention. The system 201 includes a battery management unit (BMU) 145, an electronic control unit (ECU) 150, a memory 155, a braking system 170, a steering system 180, an accelerator pedal 102, a speed sensor 103, an environment sensor 160, a weight sensor 161, a counter 162, a passenger sensor 163, a drag sensor 164, a steering sensor 165, a tire pressure sensor 166, a braking sensor 167, an accelerator sensor 168 and some or all of the components shown in FIG. 1. In various embodiments, the system 201 can include different combinations of sensors and components shown in FIGS. 1 and 2.

A driver of the vehicle 100 uses the accelerator pedal 102 to control the acceleration or movement of the vehicle 100. The accelerator pedal 102 generates or produces a pedal input, which is a value representing an amount or percentage the accelerator pedal 102 is depressed. The amount or percentage the accelerator pedal 102 is depressed can be measured using the accelerator sensor 168. An electronic throttle control (ECT), coupled to the accelerator pedal 102 and the accelerator sensor 168, can also be adjusted by the ECU 150 to execute gear changes to provide improved vehicle feel and response. The data and information from the accelerator sensor 168 is transmitted to the ECU 150.

The speed sensor 103 determines a speed (in mph or kph) of the vehicle 100. The speed sensor 103 can be coupled to the transmission 110, the rear differential assembly or the wheel assembly and is electrically connected with the ECU 150. The speed sensor 103 is configured to determine or sense a speed of the vehicle 100.

The environment sensor 160 determines a current outside environment of the vehicle 100. The environment sensor 160 is positioned near an exterior of the vehicle 110 so that it can measure or sense temperature, moisture, humidity, wind speed, and/or other external environmental conditions.

The weight sensor 161 determines a load or weighted condition of the vehicle 100. For example, the memory 155 can store a base weight of the vehicle 100 and the added weight (e.g., passengers, cargo, luggage, etc.) can be determined using the weight sensor 161. The memory 155 can also store the vehicle's maximum weight or suggested maximum weight in a fully loaded condition so the ECU 150 can determine how much additional weight or what percentage of the maximum weight is currently in the vehicle 100. The ECU 150 can also use a regression analysis to determine the additional weight in the vehicle 100.

The counter 162 is used to count or determine the time of use or operation of the vehicle 100 in terms of hours or days and count or determine the number of high degradation instances. For example, as the vehicle 100 is used or operated, the counter 162 adds the number of hours of use or operation and stores the total number of hours in the memory 155 for use by the ECU 150. Based on the number of hours of use or operation, the ECU 150 can compare this data to corresponding data in the memory 155 and predict or estimate the current age of the vehicle 100.

In addition, the counter 162 separately counts or determines the number of high degradation instances. As examples, high degradation instances include when the vehicle 100 is operating with or during high power (e.g., over 4,000 rpms), extreme temperatures (e.g., outside temperature over 110 degrees Fahrenheit or engine oil temperature over 220 degrees Fahrenheit) and high frequency (e.g., prolonged or continuous use). The greater the number of high degradation instances, the more wear on the vehicle's components and parts. As an example, if the number of high degradation instances is 10, the vehicle age may be estimated to be 1 year old, and if the number of high degradation instances is 100, the vehicle age may be estimated to be 10 years old.

The passenger or seat sensor 163 may be placed within the seat cushion of each seat or may be activated based on the number of seat belts fastened. The passenger sensor 163 determines the number of seats in the vehicle that are occupied. The greater the number of seats being occupied, the heavier the load of the vehicle 100. The ECU 150 may also estimate the loaded weight of the vehicle 100 by assigning an average weight (e.g., 100 pounds) to each passenger. For example, if 5 total passengers are in the vehicle 100 based on the passenger sensor 163, the additional weight may be set to 500 pounds.

The drag sensor 164 determines or measures the drag forces on the vehicle 100. For example, a strong headwind can contribute to a high drag force on the vehicle. The greater the drag force, the more energy that is needed to power the vehicle 100. The ECU 150 can also use a regression analysis to determine or measure the drag forces on the vehicle 100.

The steering sensor 165 determines the responsiveness of the vehicle 100 when making turns. A response target value for steering may be stored in the memory 155. For example, the response target value for steering may be 85 out of 100. If the steering is not very responsive to the driver's turns, the steering sensor 165 may return a value of 75. This may indicate that one or more of the components of the steering system 180 are worn or damaged. The steering system 180 and the steering sensor 165 can also provide traction control and vehicle stability information to the ECU 150.

The accelerator sensor 168 and the braking sensor 167 can provide data and information to the ECU 150 regarding the accelerator pedal's inputs and responsiveness and brake's inputs and responsiveness. That is, acceleration data from the accelerator pedal 102, the accelerator sensor 168 and/or the speed sensor 103 may be used by the ECU 150 to determine a value for the vehicle's responsiveness to the driver's acceleration input. Similarly, braking data from the brake pedal (part of the braking system 170), the braking sensor 167 and/or the speed sensor 103 may be used by the ECU 150 to determine a value for the vehicle's responsiveness to the driver's braking. If the vehicle 100 is responding excellent, the value may be in the 90's, if the vehicle 100 is responding good, the value may be in the 80's, if the vehicle 100 is responding fair, the value may be in the 70's and if the vehicle 100 is responding poorly, the value may be in the 60's or lower.

In addition, a response target value for acceleration and a response target value for braking may be stored in the memory 155. For example, the response target value for acceleration may be 82 out of 100 and the response target value for braking may be 88 out of 100. For example, the memory 155 may store a response target value for acceleration for a given accelerator pedal input and a response target value for braking for a given brake pedal input. The ECU 150 compares the acceleration data to the response target value for acceleration and the braking data to the response target value for braking and then determines the value for the vehicle's responsiveness to the driver's acceleration and the value for the vehicle's responsiveness to the driver's braking.

The tire pressure sensor 166 can be used to measure the tire pressure of each tire. Using the tire pressure measurements, the ECU 150 can estimate the loading condition of the vehicle 100 (i.e., whether the vehicle 100 is not loaded, partially loaded or fully loaded). For example, the memory 155 may store the recommended or unloaded tire pressure and the ECU 150 can estimate the additional weight in the vehicle 100 based on the measured tire pressure.

Any of the sensors (solely or in combination) described herein may be referred to as a first sensor, a second sensor or a third sensor. In addition, multiple sensors can be combined and referred to as a first sensor, a second sensor or a third sensor. For example, one or more of the timer and/or the counter 162 can be referred to as the first sensor. For example, one or more of the accelerator pedal input 102, the accelerator sensor 168, the braking system 170, the braking sensor 167, the steering system 180 and/or the steering sensor 165 can be referred to as the second sensor. For example, one or more of the environment sensor 160, the weight sensor 161, the passenger sensor 163, the drag sensor 164 and/or the tire pressure sensor 166 can be referred to as the third sensor.

The braking system 170 may be an antilock braking system including a hydraulic control unit, a power booster, a master cylinder assembly and a wheel sensor unit. The braking system 170 and the braking sensor 167 provide feedback information and data to the ECU 150. The braking system 170 and the braking sensor 167 can also provide traction control and vehicle stability information to the ECU 150.

The memory 155 stores a drive force map that provides a drive force or an amount of force to be applied to the transmission 110 for a given pedal input from the accelerator pedal 102 and a given vehicle speed from the speed sensor 103. The drive force map is a table that includes a drive force or an amount of force value for various combinations of given pedal inputs and given vehicle speeds.

The BMU 145 is used to monitor various parameters or states of the battery 140 such as voltage, current, temperature and state of charge (SOC) of the battery 140. The functions and operations of the BMU 145 can be implemented using software, hardware and combinations thereof.

The functions and operations of the ECU 150 can be implemented using software, hardware and combinations thereof. The sensors, systems and devices described herein can all provide information and data to the ECU 150. In addition, even though one ECU is shown in FIG. 2, the system 201 can include multiple ECUs. For example, the ECU 150 can share the information and data with other ECUs, such as a dynamics ECU (e.g., to control traction control, ABS, etc.), an energy management ECU (e.g., to control engine and motor operations), etc.

Figure 3:
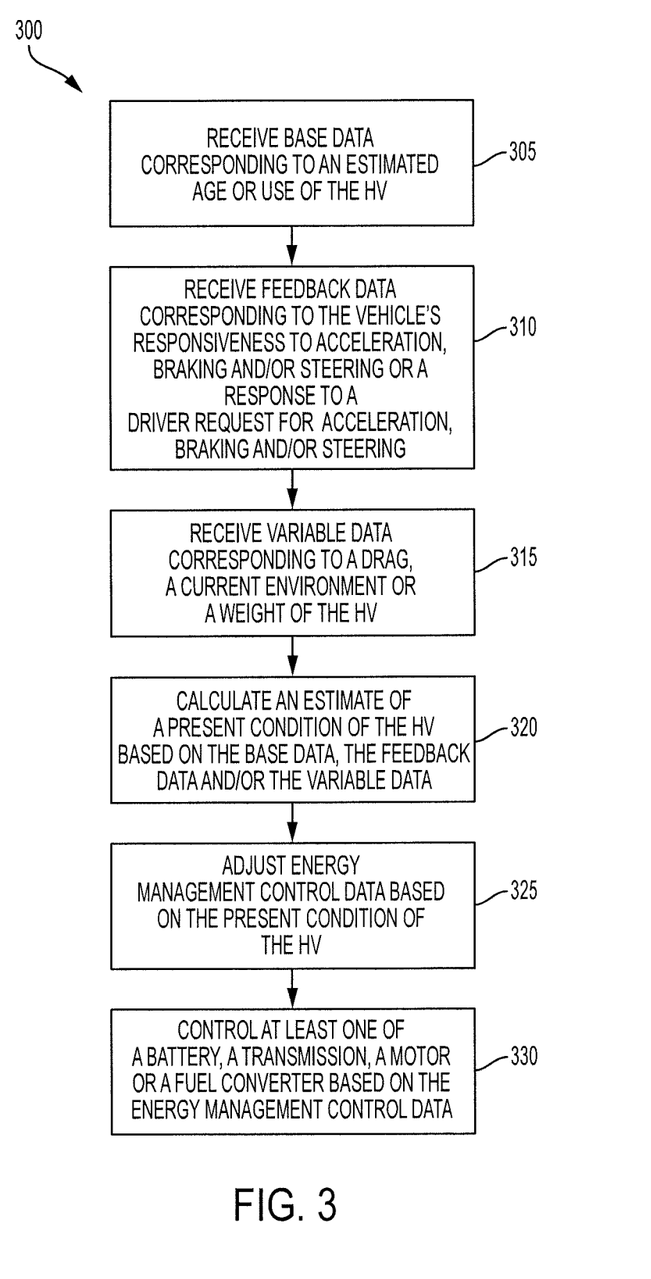
FIG. 3 illustrates a flowchart of a method for providing improved control, response and energy management for a hybrid vehicle according to an embodiment of the present invention.

FIG. 3 illustrates a flowchart 300 of a method for providing improved control, response and energy management for the hybrid vehicle 100 according to an embodiment of the present invention. The ECU 150 receives base data corresponding to an estimated age or use of the hybrid vehicle 100 (step 305). The base data may be a vehicle prediction in number of years or may be a value between 0 and 100 where 100 indicates the vehicle is new or has low mileage and 0 indicates the vehicle is very old or has very high mileage (e.g., is 20 years old or has over 200,000 miles). The estimated age or use of the hybrid vehicle 100 may be determined based on at least one of a time the motors 120, 125 and/or the engine 130 are operating (can be determined using a timer or a counter 162), driven miles or kilometers from an odometer, historical recording of use by the counter 162 or the counter 162 indicating high degradation instances. The ECU 150 may receive the base data from one or more sensors or other devices.

The ECU 150 receives feedback data corresponding to the vehicle's responsiveness to acceleration, braking and/or steering or a response to a driver request for acceleration, braking and/or steering (step 310). The feedback data may be a value between 0 and 100 where 100 indicates the vehicle is very responsive and 0 indicates the vehicle is not very responsive, for example. The feedback data may correspond to one or more of the acceleration, the braking and/or the steering. The feedback data may be determined by comparing the current vehicle response to the driver's request to a response target value stored in the memory 155. For example, the feedback data may be set to 80 if the driver request for acceleration is slightly less than a response target value for acceleration. The feedback data will be set to a value depending on how close or far the current vehicle response is to the response target value. If multiple feedback values are received, for example, for acceleration, braking and steering, the ECU 150 may average or weight these three values. The ECU 150 may receive the feedback data from one or more sensors or other devices.

The ECU 150 receives variable data corresponding to a drag, a current environment or a weight of the hybrid vehicle (step 315). The variable data is data that varies and is dependent on current conditions of the vehicle or environment. The variable data can be a value between 0 and 100 where 100 indicates the vehicle has little to no drag, the current environment is good and the vehicle has little to no load and 0 indicates the vehicle has a lot of drag, the current environment is bad (e.g., snow, rain, sleet, etc.) and the vehicle is fully loaded, for example. The drag may be determined by the drag sensor 164, the current environment may be determined by the environment sensor 160, and the weight may be determined by the weight sensor 161 and/or the passenger sensor 163. The variable data can be determined by one or more factors (e.g., drag, current environment, weight, etc.). If more than one value is provided, the ECU 150 may average or weight the values. The ECU 150 may receive the variable data from one or more sensors or other devices.

Figure 4:
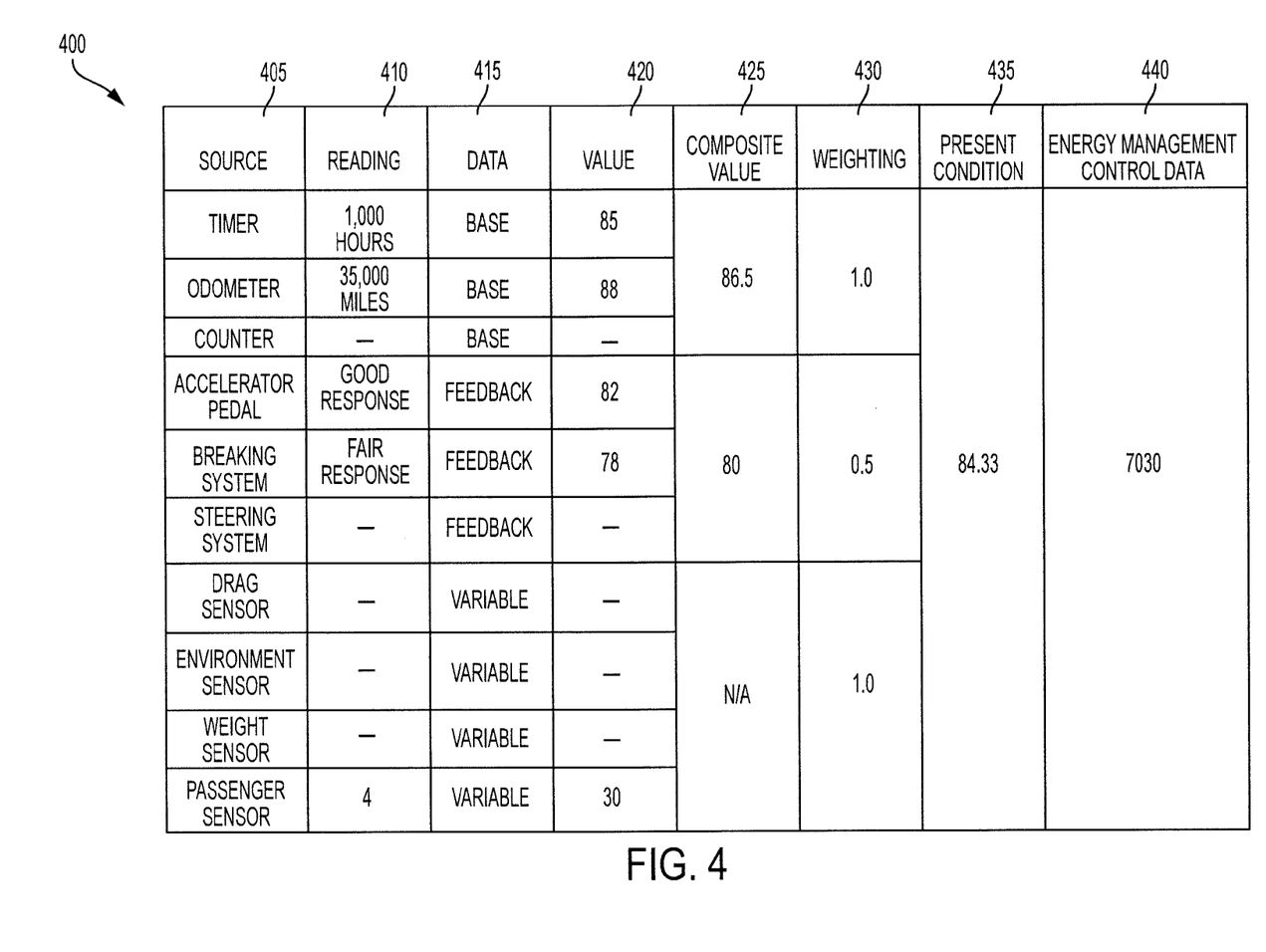
FIG. 4 is a table showing exemplary values for the base data, the feedback data, the variable data, the composite value, the weighting, the present condition of the hybrid vehicle and the energy management control data according to an embodiment of the present invention.

FIG. 4 is a table 400 showing exemplary values for the base data, the feedback data, the variable data, the composite value, the weighting, the present condition of the hybrid vehicle and the energy management control data according to an embodiment of the present invention. The table 400 includes columns that provide a source 405 of the data, a reading 410 from the source 405, a type of data 415, a value 420 for the data, a composite value 425 for the data, a weighting factor 430 for the data, an estimate of the present condition 435 of the hybrid vehicle 100 and the energy management control data 440.

Referring to FIGS. 3 and 4, the ECU 150 calculates an estimate of the present condition 435 of the hybrid vehicle 100 based on the base data, the feedback data and the variable data (step 320). The present condition 435 of the hybrid vehicle 100 is an estimated value that represents the current state or condition of the hybrid vehicle 100 in terms of its age, load, wear, high degradation instances, drag forces and/or responsiveness with regard to acceleration, braking and/or steering. In one embodiment, the base data is given more weight than the feedback data when calculating the estimate of the present condition 435 of the hybrid vehicle 100 because sometimes the feedback data is less reliable than the base data. In one embodiment, the variable data is given more weight than the feedback data when calculating the estimate of the present condition 435 of the hybrid vehicle 100 because sometimes the feedback data is less reliable than the variable data.

As shown in FIG. 4, the ECU 150 determines the values 420 for the data from various different sources 405. For example, the odometer reading is 35,000 miles and the ECU 150 assigns it a value of 88 indicating that the vehicle is fairly new. The ECU 150 may produce a composite value 425 by averaging, weighting, etc. the values 420 corresponding to the same data (e.g., base data). In this example, the two base data values are averaged to produce a composite value 425 of 86.5. The composite values 425 may also be averaged, weighted, etc. 430 to produce the present condition 435. In the example, the weighting 430 for the composite value 425 for the base data is 1.0 and the weighting 430 for the composite value 425 for the feedback data is 0.5. This results in a present condition value 435 of 84.33, which is determined as follows: (86.5×1.0+80×0.5)/1.5=84.33.

The ECU 150 adjusts (e.g., creates, determines, sets, increases or decreases) energy management control data 440 based on the estimate of the present condition 435 of the hybrid vehicle 100 (step 325). The energy management control data 440 can also be determined based on at least one of the base data, the feedback data and/or the variable data. The energy management control data 440 is a code, instruction, value, percentage or proportion representing an input or data that is applied to one or more vehicle components for future driver requests. As an example, the energy management control data 440 can be a value(s) that set the shift points for when the transmission 110 is to shift gears depending on whether fuel efficiency or responsiveness is requested by the driver. As another example, the input can be how much and when to use the different vehicle components and parts. The energy management control data 440 can be data that indicates the division of power for the vehicle components, for example, how much and when to use the motor(s) 120 and/or 125 and the engine 130. For example, the energy management control data 440 can be 7030 representing 70 percent fuel converter (e.g., engine) usage and 30 percent battery usage. The energy management control data 440 can also be used to adjust the drive force map to increase or decrease the vehicle's fuel efficiency or responsiveness. In one embodiment, the energy management control data 440 is increased when the estimate of the present condition 435 of the hybrid vehicle 100 is less than a present condition target value.

The ECU 150 controls at least one of the battery, the transmission, the motor or the fuel converter based on the energy management control data 440 (step 330). For example, the ECU 150 may control the engine 130 to operate 70 percent of the time and the battery 140 to be used to power the hybrid vehicle 100 30 percent of the time. Other vehicle components or parts can also be controlled based on the energy management control data 440. Controlling or adjusting at least one of the vehicle components allows older, used or loaded vehicles to respond more like an unloaded, new vehicle with a better feel and response.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A hybrid vehicle for providing improved control, response and energy management, the hybrid vehicle comprising:
    a memory configured to store energy management control data used to augment operations of the hybrid vehicle, and at least one of an acceleration target value, a braking target value or a steering target value;
    a first sensor configured to determine base data corresponding to an estimated age of the hybrid vehicle;
    a second sensor configured to determine at least one of acceleration data corresponding to the hybrid vehicle's responsiveness to a driver request for acceleration, braking data corresponding to the hybrid vehicle's responsiveness to a driver request for braking or steering data corresponding to the hybrid vehicle's responsiveness to a driver request for steering;
    a third sensor configured to determine variable data corresponding to a drag, a current environment or a weight of the hybrid vehicle; and
    an electronic control unit configured to:
        determine feedback data based on at least one of comparing the acceleration data to the acceleration target value, comparing the braking data to the braking target value or comparing the steering data to the steering target value;
        calculate an estimate of a present condition of the hybrid vehicle based on the base data, the feedback data and the variable data;
        adjust the energy management control data based on the estimate of the present condition of the hybrid vehicle; and
        control at least one of a battery, a transmission, a motor or a fuel converter of the hybrid vehicle based on the energy management control data.

2. The hybrid vehicle of claim 1, wherein the base data is determined based on at least one of a time, driven miles or kilometers from an odometer or a counter indicating high degradation instances.

3. The hybrid vehicle of claim 2, wherein the high degradation instances include high power usage, high temperature, high frequency or prolonged use of the battery, the motor or the fuel converter.

4. The hybrid vehicle of claim 1, wherein the fuel converter is an internal combustion engine or a fuel cell.

5. The hybrid vehicle of claim 1, wherein the energy management control data is increased when the estimate of the present condition of the hybrid vehicle is less than an energy target value.

6. The hybrid vehicle of claim 1, wherein the base data is given more weight than the feedback data when calculating the estimate of the present condition of the hybrid vehicle.

7. The hybrid vehicle of claim 1, wherein the variable data is given more weight than the feedback data when calculating the estimate of the present condition of the hybrid vehicle.

8. The hybrid vehicle of claim 1, wherein the feedback data is adjusted when the responsiveness to the driver request for acceleration, braking or steering is less than a respective target value.

9. A hybrid vehicle for providing improved control, response and energy management, comprising:
    a transmission;
    a battery for storing energy;
    a memory configured to store energy management control data used to augment operations of the hybrid vehicle, and at least one of an acceleration target value, a braking target value or a steering target value;
    a motor for receiving energy from the battery and for providing power to the transmission;
    a fuel converter for providing energy to the battery and for providing power to the transmission;
    a first sensor configured to determine variable data corresponding to a drag, a current environment or a weight of the hybrid vehicle;
    a second sensor configured to determine at least one of acceleration data corresponding to the hybrid vehicle's response to a driver request for acceleration, braking data corresponding to the hybrid vehicle's response to a driver request for braking or steering data corresponding to the hybrid vehicle's response to a driver request for steering; and
    an electronic control unit configured to:
        determine feedback data based on at least one of comparing the acceleration data to the acceleration target value, comparing the braking data to the braking target value or comparing the steering data to the steering target value,
        calculate an estimate of a present condition of the hybrid vehicle based on the variable data and the feedback data,
        adjust the energy management control data based on the estimate of the present condition of the hybrid vehicle, and control at least one of the battery, the transmission, the motor or the fuel converter of the hybrid vehicle based on the energy management control data.

10. The hybrid vehicle of claim 9, further comprising a third sensor configured to determine base data corresponding to an estimated age of the hybrid vehicle and wherein the electronic control unit is configured to calculate the estimate of the present condition of the hybrid vehicle based on the base data, the feedback data and the variable data.

11. The hybrid vehicle of claim 9, wherein the fuel converter is an internal combustion engine or a fuel cell.

12. A method for providing improved control, response and energy management for a hybrid vehicle having a battery, a transmission, a motor, a fuel converter and an electronic control unit, the method comprising:
   storing, by a memory, energy management control data used to augment operations of the hybrid vehicle, and at least one of an acceleration target value, a braking target value or a steering target value;
   receiving, by the electronic control unit, base data corresponding to an age of the hybrid vehicle;
   receiving, by the electronic control unit, at least one of acceleration data corresponding to the hybrid vehicle's responsiveness to acceleration, braking data corresponding to the hybrid vehicle's responsiveness to a driver request for braking or steering data corresponding to the hybrid vehicle's responsiveness to a driver request for steering;
   receiving, by the electronic control unit, variable data corresponding to a drag, a current environment or a weight of the hybrid vehicle;
   determining, by the electronic control unit, feedback data based on at least one of comparing the acceleration data to the acceleration target value, comparing the braking data to the braking target value or comparing the steering data to the steering target value;
   calculating, using the electronic control unit, an estimate of a present condition of the hybrid vehicle based on the base data, the feedback data and the variable data;
   adjusting, using the electronic control unit, the energy management control data based on the estimate of the present condition of the hybrid vehicle; and
   controlling at least one of the battery, the transmission, the motor or the fuel converter based on the energy management control data.

13. The method of claim 12, wherein the base data is determined based on at least one of a time, driven miles or kilometers from an odometer or a counter indicating high degradation instances.

14. The method of claim 13, wherein the high degradation instances include high power usage, high temperature, high frequency or prolonged use of the battery, the motor or the fuel converter.

15. The method of claim 12, wherein the fuel converter is an internal combustion engine or a fuel cell.

16. The method of claim 12, wherein the energy management control data is increased when the estimate of the present condition of the hybrid vehicle is less than an energy target value.

17. The method of claim 12, wherein the base data is given more weight than the feedback data when calculating the estimate of the present condition of the hybrid vehicle.

18. The method of claim 12, wherein the variable data is given more weight than the feedback data when calculating the estimate of the present condition of the hybrid vehicle.

19. The method of claim 12, wherein the feedback data is adjusted when the hybrid vehicle's responsiveness to acceleration, braking or steering is less than a respective target value.

* * * * *